United States Patent
Takeo

(10) Patent No.: US 6,950,205 B2
(45) Date of Patent: Sep. 27, 2005

(54) PERIPHERAL DEVICE MANAGING SYSTEM, JOB SENDING METHOD AND STORING MEDIUM

(75) Inventor: Akinori Takeo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/410,320

(22) Filed: Apr. 9, 2003

(65) Prior Publication Data

US 2003/0197885 A1 Oct. 23, 2003

(30) Foreign Application Priority Data

Apr. 19, 2002 (JP) ......................................... 2002-118177

(51) Int. Cl.$^7$ ........................... G06K 15/00; H04N 1/00
(52) U.S. Cl. ..................................... 358/1.15; 358/406
(58) Field of Search ................................. 713/170, 200; 709/218; 358/1.5, 1.9, 1.13, 1.14, 1.15, 500, 501, 401, 403, 404, 444, 406, 442, 471, 296, 1.6

(56) References Cited

U.S. PATENT DOCUMENTS

| | | | | |
|---|---|---|---|---|
| 6,226,097 B1 | * | 5/2001 | Kimura | ..................... 358/1.14 |
| 2002/0016921 A1 | * | 2/2002 | Olsen et al. | ................. 713/200 |
| 2003/0033368 A1 | * | 2/2003 | Tominaga | |
| 2003/0158912 A1 | * | 8/2003 | Simpson et al. | ............ 709/218 |
| 2004/0083367 A1 | * | 4/2004 | Garg et al. | ................. 713/170 |

FOREIGN PATENT DOCUMENTS

| | | | | | |
|---|---|---|---|---|---|
| JP | 2002245361 | * | 8/2002 | .......... | G06F/17/60 |
| JP | 2003271360 A | * | 9/2003 | ............ | G06F/3/12 |

* cited by examiner

Primary Examiner—Jerome Grant, II
(74) Attorney, Agent, or Firm—Cowan, Liebowitz & Latman, P.C.

(57) ABSTRACT

An object of the present invention is to permit smooth and proper charge processing by also permitting charging with respect to charging destination other than the user who inputs a job for charge processing. In a peripheral device managing system in which a peripheral device for receiving and processing a job, a client for sending the job to the peripheral device and a server apparatus for managing the peripheral device are interconnected via a network, the server apparatus includes means for issuing a job ticket as a job issue license to the client, the job includes at least the issued job ticket as attribution information, and the peripheral device includes means for interpreting the job ticket included in the attribution information of the job and means for confirming the fact that issuing of the job is allowed by the server apparatus on the basis of the job ticket, thereby permitting the charge processing with respect to allowed agent charging destination.

11 Claims, 6 Drawing Sheets

FIG. 4

| ACCOUNT ID | USER ID |
|---|---|
| 0001 | 1234, 1111, 2222 |
| 0002 | ABCD, 1234 |
| …… | …… |

FIG. 5

| ACCOUNT ID | CHARGE COUNTER | CHARGE COUNTER LIMIT |
|---|---|---|
| 0001 | 100 | 100 |
| 0002 | 200 | 1000 |
| …… | …… | …… |

PERIPHERAL DEVICE MANAGING SYSTEM, JOB SENDING METHOD AND STORING MEDIUM

BACKGROUND OF THE INVENTION

1. Field of the Invention

The present invention relates to a peripheral device managing system and a job sending method, and, more particularly, it relates to a technique suitable to be used for charge processing of a job.

2. Related Background Art

Conventionally, when charge processing is executed by transmission via a network, in a peripheral device for receiving a job from an information processing apparatus and for processing such a job, there were provided charge counters for respective users so that charging for each user was performed by the charge processing. Further, when two or more users were registered as a group, there were provided charge counters for respective groups so that charging for each group was performed by the charge processing.

However, there has been a problem that the user who inputs the job or the group to which such a user belongs is not always a subject to whom the charge for the job processing is directly requested. For example, when a certain user A inputs the job on the basis of the request of another user B, if the user B who is a client for the job bears expense for the job processing, it is required that a charging destination for the job be the user B, rather than the user A.

Further, when job processing required for a certain specific business is performed, it is desirable that the charge count be performed with respect to the charging destination which should bear the business expense, in place of the fact that the charge counter for the user who inputs the job is selected as the charging destination.

SUMMARY OF THE INVENTION

The present invention is made in consideration of the above-mentioned problems, and an object of the present invention is to enable smooth and proper charge processing by designing so that charging can also be effected with respect to charging destinations other than the user who inputs a job for charge processing.

According to one aspect of the present invention, there is provided a peripheral device managing system comprising a client to which a job is sent, a peripheral device for receiving and processing the job, a server apparatus for managing the peripheral device, a network for connecting between the client and the peripheral device and the server apparatus and wherein the server apparatus includes means for issuing a job ticket as a job issue license to the client and the job includes at least the issued job ticket as attribution information and the peripheral device includes means for interpreting the job ticket included in the attribution information of the job and means for confirming the fact that issuing of the job is permitted by the server apparatus on the basis of the job ticket.

The other objects, features and advantages of the present invention will be apparent from the following detailed description of the invention and the attached drawings.

BRIEF DESCRIPTION OF THE DRAWINGS

FIG. 4 is a view for showing an example of a corresponding table indicating a relationship between user ID held by the server apparatus of FIG. 1 and licensed charging destination account;

FIG. 5 is a view for showing an example of charge information for account IDs held by the server apparatus;

DESCRIPTION OF THE PREFERRED EMBODIMENTS

Now, embodiments of a peripheral device managing system and a job sending method according to the present invention will be explained with reference to the accompanying drawings.

Figure 1:
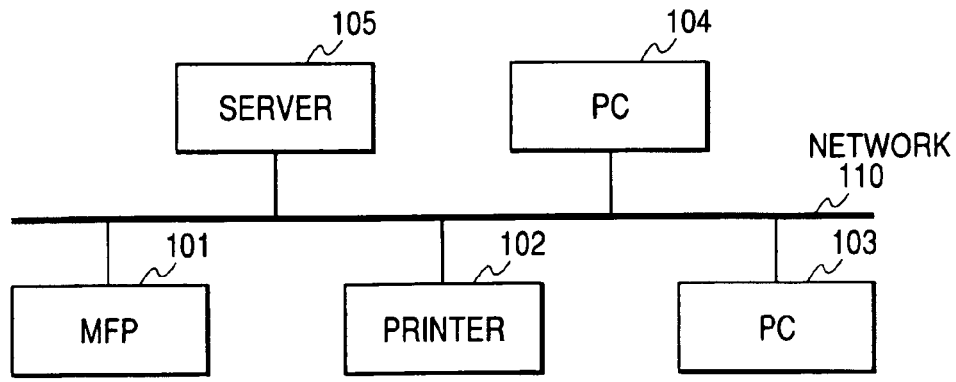
FIG. 1 is a block constructional view of a peripheral device managing system according to an embodiment of the present invention.

FIG. 1 is a block constructional view of a peripheral device managing system according to an embodiment of the present invention.

In FIG. 1, an MFP (multi function peripheral) 101 and a printer 102 which are connected to a network 110 are both peripheral devices as subjects to be managed in the peripheral device managing system.

The multi function peripheral 101 can process a print job, a scanner job, a copy job, a FAX sending job and a FAX receiving job, and the printer 102 can process the print job.

In the present invention, the peripheral devices constituting the peripheral device managing system may include the MFP 101 and the printer 102 or may include a FAX and a scanner or other peripheral devices which can be connected to the network.

A personal computer (PC) 103 and a personal computer (PC) 104 are information processing apparatuses which become clients utilized when the user uses the peripheral device managing system. Further, a server apparatus 105 is an information processing apparatus for managing and controlling the whole peripheral device managing system.

In the illustrated embodiment, in FIG. 1, the user requests job processing to the peripheral device 101 or 102 via the network 110 by using the personal computer (PC) 103 or the personal computer (PC) 104. Further, the server apparatus 105 performs communication between the peripheral devices 101, 102 and the personal computers (PCs) 103, 104 via the network 110 and operates the peripheral device managing system.

Figure 2:
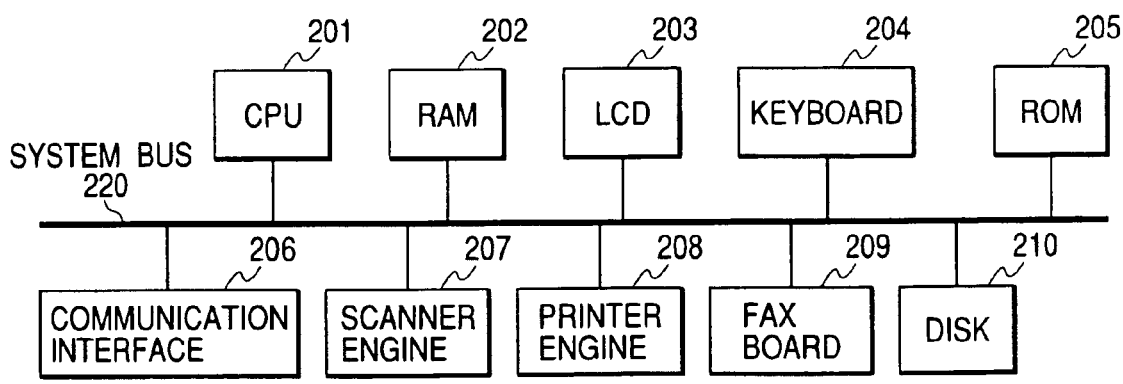
FIG. 2 is a block constructional view of hardware in peripheral devices of an MFP and a printer of FIG. 1.

FIG. 2 is a block constructional view of hardware in peripheral devices of the MFP 101 and the printer 102 of FIG. 1. As shown in FIG. 2, a CPU 201, a RAM 202, an LCD 203, a keyboard 204, a ROM 205, a communication interface 206, a scanner engine 207, a printer engine 208, a FAX board 209 and a disk 210 are interconnected via a system bus 220. A program for controlling the peripheral devices is stored in the ROM 205 or the disk 210 and is read out into the RAM on demand and is executed by the CPU 201.

Further, attribution information showing functions and conditions of the peripheral devices and jobs processed in such peripheral devices and job log for recording job data to be outputted and a result of job processing, as well as the control program, are stored in the ROM 205 and/or the disk 210. Further, the CPU 201 performs communication with respect to external devices via the communication interface 206.

In the illustrated embodiment, so long as definition is not given specially, in the peripheral devices shown in FIG. 2, the CPU 201 receives user's input from the keyboard 204 via the system bus 220 and controls the RAM 202, LCD 203, ROM 205, communication interface 206, scanner engine 207, printer engine 208, FAX board 209 and disk 210.

In the peripheral devices having the above-mentioned construction, issuing of the scanner job is permitted by selecting the scanner engine 207 and issuing of the print job is permitted by selecting the printer engine 208. Further, issuing of the copy job is permitted by selecting the printer engine 208 and the scanner engine 207 and issuing of the FAX sending job and the FAX receiving job is permitted by selecting the scanner engine 207, printer engine 208 and FAX board 209.

Figure 3:
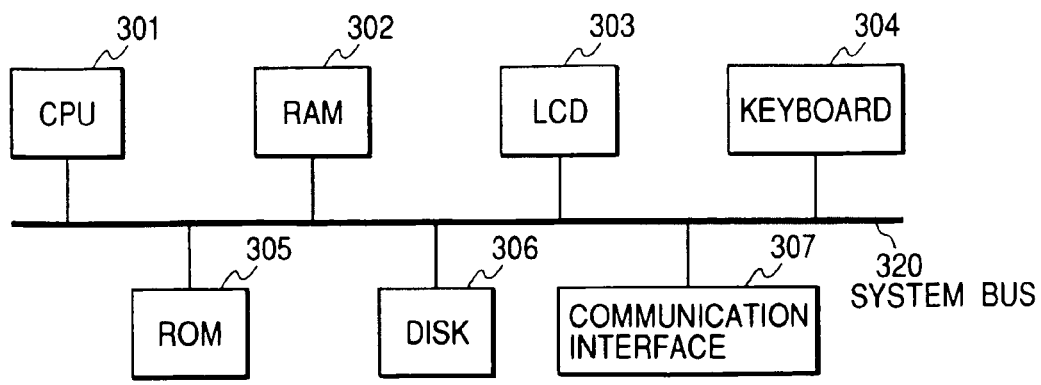
FIG. 3 is a block constructional view of hardware in a personal computer (PC) or an information processing apparatus of a server apparatus of FIG. 1.

FIG. 3 is a block constructional view of hardware in the information processing apparatuses such as the personal computer (PC) 103 and the personal computer (PC) 104 or the server apparatus 105. As shown in FIG. 3, a CPU 301, a RAM 302, an LCD 303, a keyboard 304, a ROM 305, a disk 306 and a communication interface 307 are interconnected via a system bus 320. A program for controlling the information processing apparatuses is stored in the ROM 305 or the disk 306 and is read out into the RAM 302 on demand and is executed by the CPU 301. Further, the CPU 301 performs communication with respect to external devices via the communication interface 307.

In the illustrated embodiment, in the peripheral devices shown in FIG. 3, the CPU 301 receives user's input from the keyboard 304 via the system bus 320 and controls the RAM 302, LCD 303, ROM 305, disk 306 and communication interface 307.

FIG. 4 is a view for showing an example of a corresponding table indicating a relationship between user ID held by the server apparatus 105 of FIG. 1 and licensed charging destination account. In FIG. 4, account ID "0001" shown by the reference numeral 401 indicates the fact that the users of user IDs "1234," "1111" and "2222" shown by the reference numeral 402 are permitted to use such account ID as charging destination account. Similarly, regarding account ID "0002" shown by the reference numeral 403, the fact that the users of user IDs "ABCD" and "1234" shown by the reference numeral 404 are permitted to use such account ID as charging destination account is indicated.

The charging destination accounts as shown by the user IDS 402 and 404 are accounts for designating expense bearing destination different from the user when the job is executed, which destination may be, for example, charging destination for all jobs regarding special business or charging destination for jobs which are used properly in accordance with business by the user or charging destination for jobs which are changed in accordance with the contents of the job. Further, the corresponding table shown in FIG. 4 can be referred to from externally on demand by a client such as a manager having required authority or contents thereof can be renewed by adding or deleting the account ID or the licensed user ID.

As shown in FIG. 4, the server apparatus 105 holds the corresponding table indicating the relationship between each account ID and the corresponding user ID which can be used as the charging destination, so that, on the basis of the table, when the client requests the job ticket, judgment of count allowance regarding the charging destination account can be effected.

FIG. 5 is a view for showing an example of charge information for account IDs held by the server apparatus 105 of FIG. 1. A column 501 shows account IDs indicating the charging destination accounts and a column 502 shows values of present charge counters corresponding to the account IDs in the column 501. Further, a column 503 shows upper limit values of the counters set for the account IDs in the column 501. In this example, when the value of the charge counter in the column 502 reaches the upper limit value of the set counter in the column 503, the charge counter cannot be counted. The charge information shown in FIG. 5 is merely an example, and, for example, the server apparatus may hold resource counters for indicating counts of consumption goods such as media for the respective account IDs or counters used for the charging.

Further, in the above-mentioned charge information, the account ID can be added or deleted from the client or the peripheral device or the charge counter for the account ID or the maximum value of the charge counter can be renewed.

As shown in FIG. 5, the server apparatus 105 holds the charge information for each charge account so that the present value of the charge counter for each account ID can be ascertained on demand by referring the charge information. Further, when the maximum value of the charge counter for each account ID is set, by comparing the maximum value with the value of the charge counter, judgment of count allowance for the charge account can be made.

Figure 6:
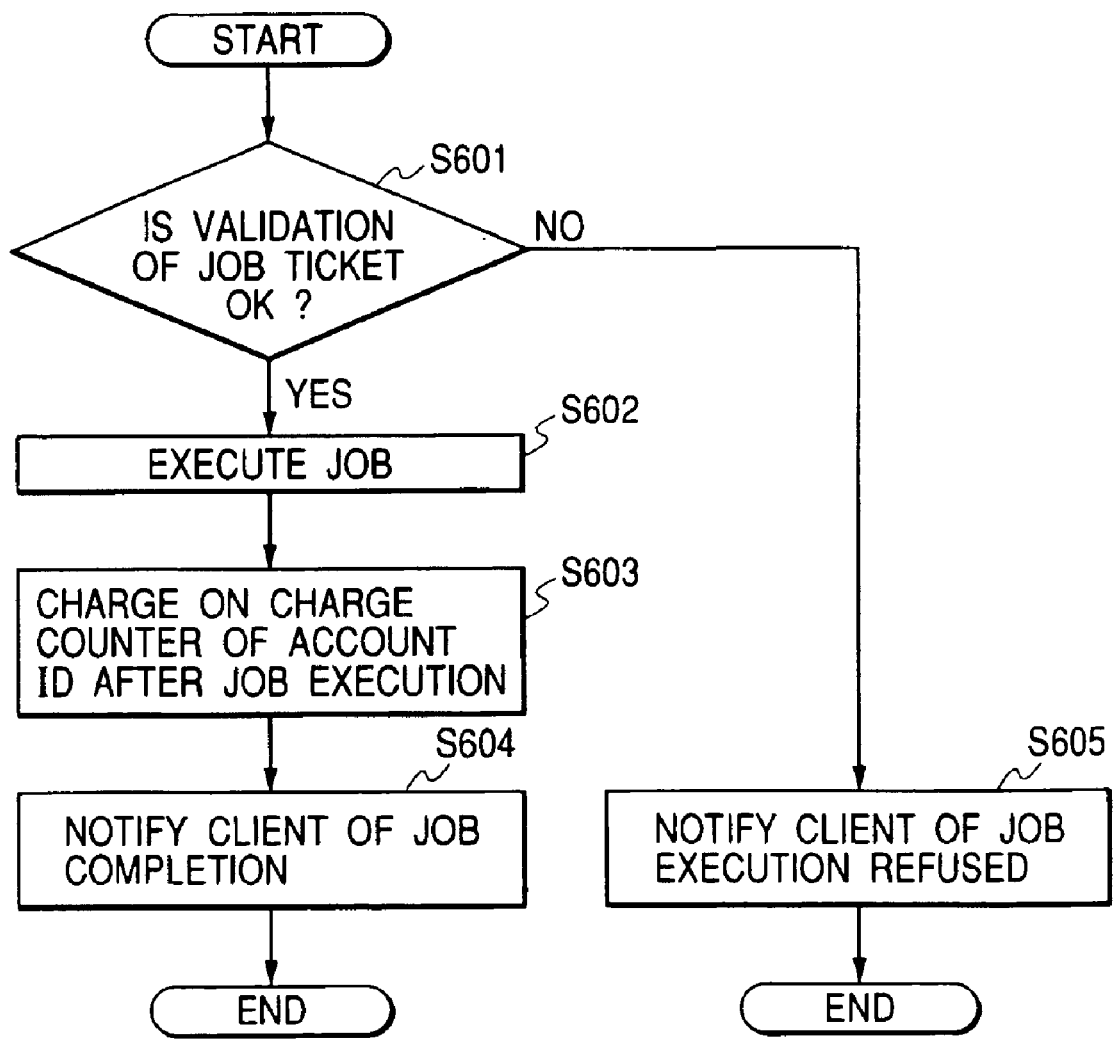
FIG. 6 is a flow chart of a peripheral device for receiving a job and performing charge processing.
Figure 7:
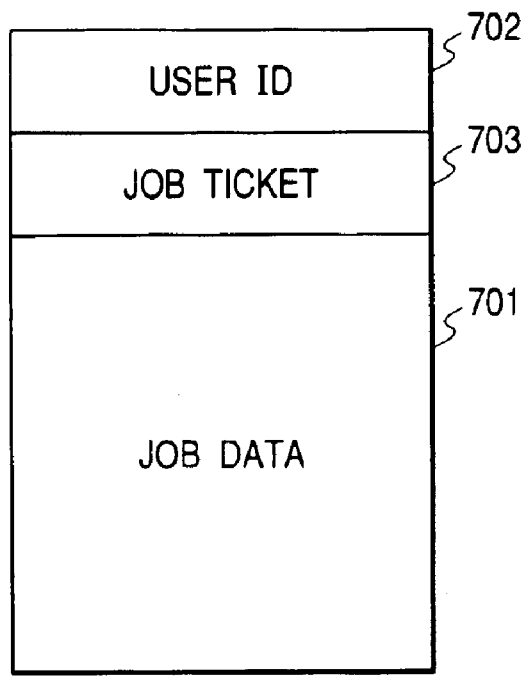
FIG. 7 is a view for showing an example of a construction of a job which is sent from a client to the peripheral device.
Figure 8:
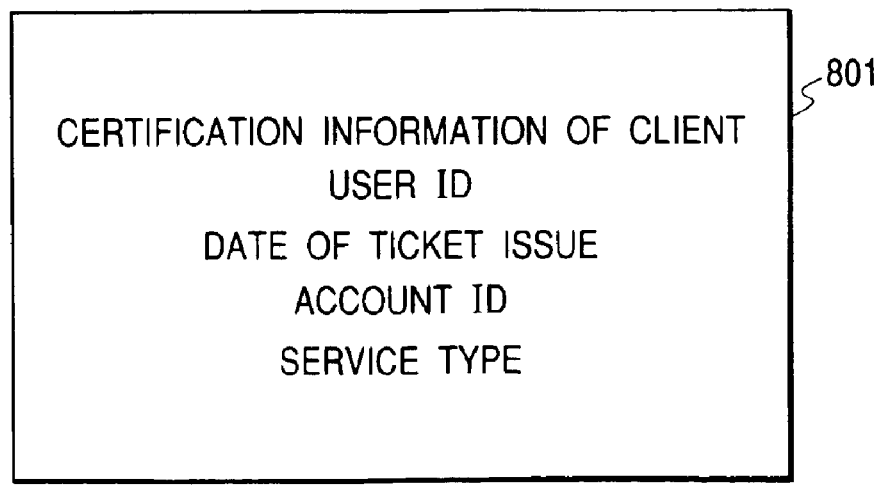
FIG. 8 is a view for showing an example of a job ticket included in the job of FIG. 7.

FIG. 6 is a flow chart of a peripheral device for receiving the job and performing the charge processing. In FIG. 6, in a step S601, a job ticket 703 is taken out from a job received from a client having a construction as shown in FIG. 7 and contents of the job ticket 703 taken out is interpreted, and it is ascertained whether or not the job ticket 703 is a formal ticket issued by the server apparatus on the basis of constructional contents of the job ticket as shown in FIG. 8 and issued from the server apparatus 105 to the client.

Here, the means for ascertaining the contents of the job ticket 703 may be a technique in which the entire job ticket 703 is coded in a form that is hard to be altered or decoded by the client, for example, by utilizing a public key cryptograph system and the job ticket is issued from the server apparatus 105 to the client and the peripheral device which receives the coded job ticket 703 decodes and interprets the job ticket 703 by a decoding key held by the peripheral device thereby to ascertain the contents of the job ticket by comparing the contents of the job ticket 703 with contents presented by the client.

As a result of the ascertainment in the step S601, if the contents of the job ticket 703 are formal, the program goes to a step S602. On the other hand, as the result of the ascertainment in the step S601, if the contents of the job ticket 703 are not regarded as formal, the program goes to a step S605.

Then, in the step S602, since it is ascertained that the job ticket 703 is formal, the requested job is executed.

Then, in a step S603, after the execution of the job is completed, as charge processing for the account ID described in the job ticket 703, the account ID and the charge count for the job processing are noticed to the server apparatus 105 and the charging is performed. The server apparatus 105 retrieves the corresponding account ID from the column 501 in FIG. 5 on the basis of the notification of the charge count and counts the charging with respect to the charge counter included in the column 502 and corresponding to the account ID.

Then, in a step S604, the fact that the execution of the job is completed is notified to the requesting client and then the processing is finished.

On the other hand, in the step S605, since the job ticket 703 is informal, the fact that the execution of the job is refused is notified to the client and then the processing is finished.

By the charge processing of the peripheral device shown in FIG. 6, after the job including the job ticket 703 is processed, the charging can be performed with respect to the account ID designated in the job ticket 703 and the charging can also be performed with respect to the charging destination other than the user who inputs the job of the charge processing.

FIG. 7 is a view for showing an example of a construction of a job sent from the client to the peripheral device. In FIG. 7, job data 701 indicating a processing subject and processing contents of the job. The reference numeral 702 denotes user ID of the client to which the job is sent, and the reference numeral 703 denotes a job ticket having a construction as shown in FIG. 8 and issued from the server apparatus 105. The job ticket is constituted in a form that is hard to be interpreted by the client.

The construction of the job shown in FIG. 7 is merely an example, but, other than this, the job may include all elements as attribution of the job such as a name of the job and the details of the job processing or may include contents constituting a job ticket 801 (FIG. 8) by which the client causes the peripheral device to recognize his own identity by comparing with the contents of the job ticket.

FIG. 8 is a view for showing an example of a construction of the job ticket 703 included in the job of FIG. 7. The server apparatus 105 issues a job ticket 801, and the job ticket includes certain certification information of client for certifying the identity of the client who sends the job, user ID of the client, the data and hour when the job ticket 801 was issued, account ID indicating the charging destination for the job processing and a job type allowed by the job ticket 801.

This construction of the job ticket 801 is merely an example, but the job ticket may include other information. Further, it is not necessary that the contents of the job ticket 801 can be interpreted by the client, so long as the peripheral device for receiving and processing the job including the job ticket 801 can interprets such contents.

By using the job ticket 801 shown in FIG. 8, it is certified that the contents of the job which is requested from the client to the server apparatus 105 and the charging destination account for the job processing are allowed. Further, on the basis of the job ticket 801, the peripheral device can recognize the fact that the job sent from the client and its contents and charging destination account are allowed.

Figure 9:
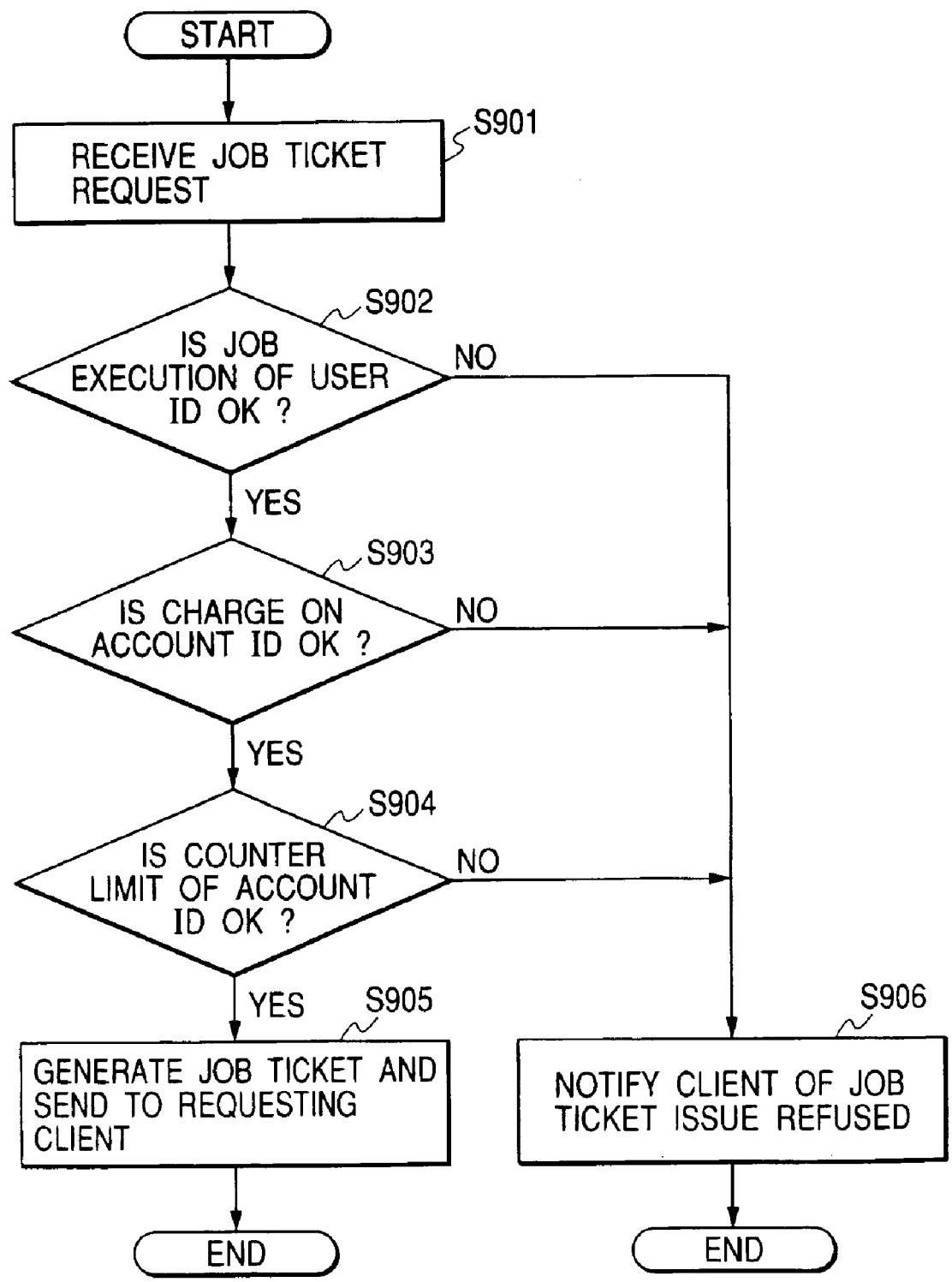
FIG. 9 is a flow chart of processing in which the server apparatus which receives job ticket issue request from the client issues the job ticket.

FIG. 9 is a flow chart of processing in which the server apparatus which receives job ticket issue request from the client issues the job ticket. In a step S901 of FIG. 9, the job ticket issue request from the client is received. The job ticket issue request includes at least the user ID and the charging destination account of the job but, other than them, may include a password for certifying the job type and the client and information obtained by coding the password.

Then, in a step S902, on the basis of user registration information registered in the server apparatus 105, it is judged whether the job of the user ID of which the job ticket issue is requested from the client is executed or not. In the judgment in the step S902, it is judged whether the user ID of which the job ticket issue is requested from the client is the user registered in the server apparatus 105 and whether the job execution is allowed, thereby performing the user certification.

As a result of the judgment in the step S902, if the job execution of the user ID is allowed, the program goes to a step S903. On the other hand, as the result of the judgment in the step S902, if the job execution of the user ID is not allowed, the program goes to a step S906.

Then, in the step S903, by referring the corresponding table between the account ID and the user ID as shown in FIG. 4, it is judged whether the charging of the user ID of which the job is executed is allowed or not with respect to the charging destination account ID included in the job ticket issue request. As a result of this judgment, if the charging for the account ID is allowed, the program goes to a step S904. On the other hand, as the result of the judgment in the step S903, if the charging for the account ID is not allowed, the program goes to the step S906.

Then, in the step S904, by referring the charge information for each account ID shown in FIG. 5, it is judged whether the value of the charge counter 502 of the account ID reaches the limit value (maximum value) 503 of the charge counter or not. As a result of this judgment, if the value does not reach the limit value (maximum value), the program goes to a step S905. On the other hand, as the result of the judgment in the step S904, if the value of the charge counter 502 of the account ID already reached the set limit value (maximum value) 503 of the charge counter, the program goes to the step S906.

Then, in the step S905, the server apparatus 105 executes the job requested by the client who performs the job ticket issue request and performs use allowance of the designated charge counter, and, since the present value of the charge counter 502 of the account ID is within a range of the-set limit value (maximum value), the job ticket as shown in FIG. 8 is issued to the client, and, then, the processing is finished.

On the other hand, in the step S906, it is judged that the requesting client goes not have competence or authority for executing the requested job or a condition required for the execution is not satisfied, and the fact that the issue of the job ticket is refused is notified to the client, and, then, the processing is finished.

By the processing shown in FIG. 9, the server apparatus 105 ascertains whether or not the client has the competence for the job sending with respect to the job ticket issue request and whether or not the designated charging destination account can be used, and can issue the job ticket which satisfies such conditions.

Figure 10:
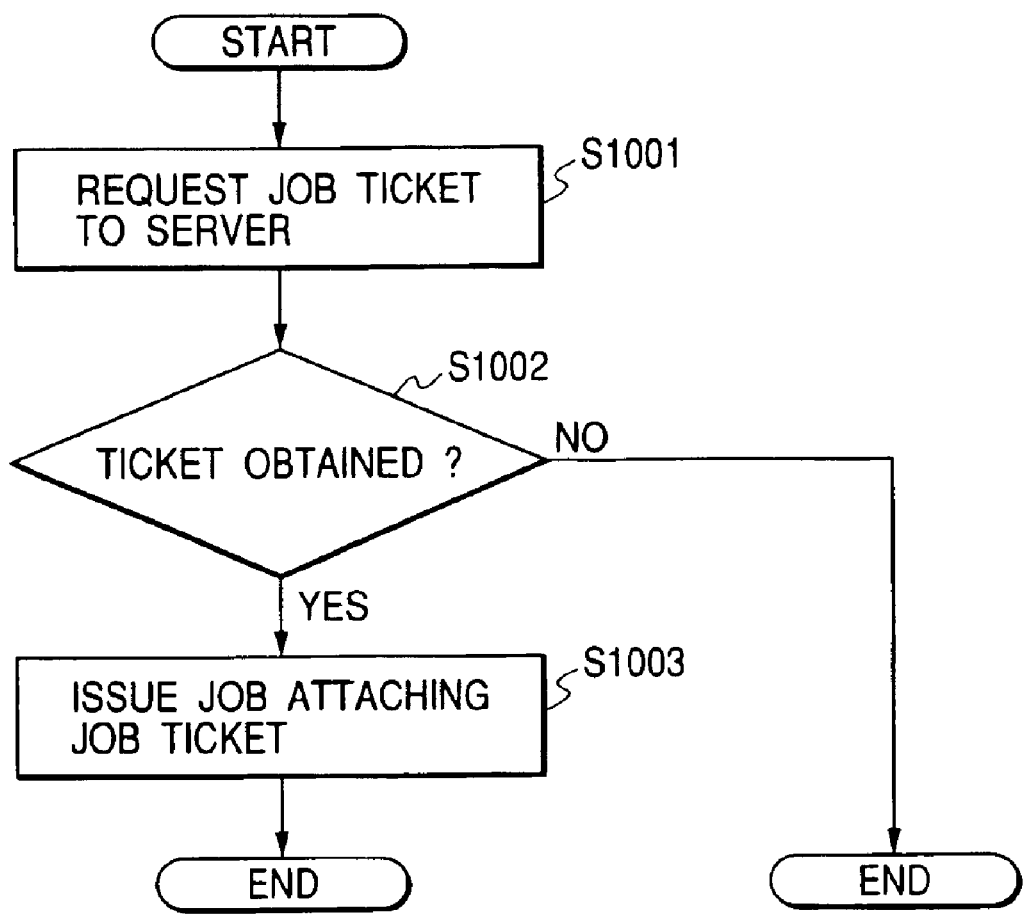
FIG. 10 is a flow chart of processing for sending the job from the client to the peripheral device.

FIG. 10 is a flow chart of processing for sending the job from the client to the peripheral device. This processing corresponds to the processing for issuing the job ticket by the server apparatus 105 shown in FIG. 9.

In FIG. 10, in a step S1001, the client presents the user ID and the charging destination account ID for the job processing to the server apparatus 105 thereby to request the issue of the job ticket. Other than them, such issue request of the job ticket may include a password corresponding to the user ID in order to certify the job type and the user and values obtained by coding the password.

Then, in a step S1002, it is judged whether or not the job ticket is issued from the server apparatus 105 on the basis of the job ticket issue request in the step S1001. As a result of this judgment, if the job ticket is issued, the program goes to a step S1003. On the other hand, as the result of the judgment in the step S1002, if the job ticket is not issued, the processing is finished.

Then, in the step S1003, the job as shown in FIG. 7 is generated by attaching the job ticket issued in the step S1002 and the generated job is sent to the peripheral device, and, then, the processing is finished.

By the job issue processing shown in FIG. 10, after the fact that the client himself and the contents of the job issued by the client are formal is certified, the job execution can be requested to the peripheral device.

(Other Embodiments)

The present invention can be applied to not only a system constituted by a plurality of devices (for example, a host computer, an interface device, a reader, a printer and the like) but also a system constituted by a single device (for example, a copier or a facsimile apparatus).

Further, it should be noted that the present invention includes a concept that a program code of software for realizing a function of the above-mentioned embodiment is supplied to a computer (CPU or MPU) of an apparatus or a system connected to the various devices so that the various devices are operated to realize the function of the above-mentioned embodiment, in accordance with the program code stored in the computer of the apparatus or the system.

In this case, the program code of the software itself realizes the function of the above-mentioned embodiment, and the program code constitutes the present invention. As a transferring medium for the program code, a communication medium (a wire circuit such as optical fibers or a wireless circuit) in a computer network (LAN, WAN such as internet, radio communication network or the like) system for propagating and supplying program information as a transferring wave can be used.

Further, means for supplying the program code to the computer, for example, a storing medium storing such a program code constitutes the present invention. As the storing medium for storing the program code, for example, a flexible disk, a hard disk, an optical disk, a photo-magnetic disk, a CD-ROM, a magnetic tape, a non-volatile memory card, a ROM or the like can be used.

Further, also when not only the function of the above-mentioned embodiment is realized by executing the supplied program code by means of the computer, but also the function of the above-mentioned embodiment is realized by the program code in cooperation with OS (operating system) operating on the computer or other application software, the program code is included in the scope of the present invention.

Further, the present invention includes a concept that, after the supplied program code is stored in a memory of a function expansion board of the computer or of a function expansion unit connected to the computer, a CPU of the function expansion board or the function expansion unit executes the actual processing partially or totally in accordance with instruction of the program code to realize the function of the above-mentioned embodiment.

Incidentally, configurations and structures of the various elements shown in the above-mentioned embodiment are merely an example for embodying the present invention and thus do not limit the scope of the present invention. That is to say, various modifications and alterations can be made without departing from the spirit and scope of the present invention.

As mentioned above, according to the above-mentioned embodiments, the server apparatus can issue the job ticket including certification that the charging destination account of the job is allowed with respect to the job ticket issue request from the client, and the client can issue the job in which the contents of the job and allowance of use of the charging destination account are certified, by acquiring the job ticket as the job issue license from the server apparatus and attaching the job ticket to the job, and the peripheral device cab perform the charge processing with respect to the charging destination to which the charging is allowed, by receiving the job from the client. In this way, since the charge processing can be performed with respect to the allowed agent charging destination, the smooth and proper charge processing can be performed.

What is claimed is:

1. A job accounting system comprising a peripheral device managing system comprising a peripheral device, a client device, server device, and a network for connecting between the peripheral device and the client device and the server device, wherein:

the server device comprising:

means for receiving a job ticket request including a client user ID and an account ID from the client device;

means for judging whether or not a job ticket is issued based on the job ticket request; and means for issuing the job ticket to the client device according to a result of the judgment, wherein the job ticket includes the account ID;

the client device comprising:

means for generating a job by attaching the job ticket issued to a job data indicating a processing subject and processing contents of the job; and means for transmitting the generated job to the peripheral device;

the peripheral device comprising:

means for processing the generated job; and means for notifying the server device of the account ID included in the job ticket of the processed job and a charge count for the job processing;

the server comprising:

means for performing charge process in accordance with the notified account ID and the notified charge count for the job processing.

2. A system according to claim 1, further comprising means for storing a limit value of charge account each account ID, wherein the means for issuing issues the job ticket in accordance with the limit value of charge account in corresponding to the account ID included in the job ticket request.

3. A control method for controlling a client device, connected to a peripheral device and server device via a network, comprising the steps of:

transmitting a job ticket request including a client user ID and an account ID to the server device;

receiving a job ticket issued in response to the job ticket request from the server device;

generating a job by attaching the job ticket issued to a job data indicating a processing subject and processing contents of the job; and transmitting the generated job to the peripheral device, wherein a charge count for the job processing by the peripheral device is transmitted with the account ID included in the job ticket of the generated job from the peripheral device to the server device.

4. A computer-readable medium containing a program for causing a computer to execute the steps according to claim 3.

5. A client device connected to a peripheral device and server device via a network, comprising:

means for transmitting a job ticket request including a client user ID and an account ID to the server device;

means for receiving a job ticket issued in response to the job ticket request from the server device;

means for generating a job by attaching the job ticket issued to a job data indicating a processing subject and processing contents of the job; and means for transmitting the generated job to the peripheral device, wherein a charge count for the job processing by the peripheral device is transmitted with the account ID included in the job ticket of the generated job from the peripheral device to the server device.

6. A control method for controlling a server device, connected to a peripheral device and a client device via a network, comprising the steps of:

receiving a job ticket request including a client user ID and an account ID from the client device;

judging whether or not a job ticket is issued based on the job ticket request;

issuing the job ticket to the client device according to a result of the judgment, wherein the job ticket includes the account ID;

receiving the account ID included in the job ticket of a job to be generated by attaching the job ticket issued to a job data indicating a processing subject and processing contents of the job and a charge count for the job to be processed by the peripheral device from the peripheral device; and performing charge process in accordance with the received account ID and the received charge account for the job processing.

7. A method according to claim 6, further comprising the step of storing a limit value of charge account each account ID, wherein the step of issuing issues the job ticket in accordance with the limit value of charge account in corresponding to the account ID included in the job ticket request.

8. A computer-readable medium containing program codes for a control method for controlling a server device, connected to a peripheral device and a client device via a network, comprising the steps of:

receiving a job ticket request including a client user ID and an account ID from the client device;

judging whether or not a job ticket is issued based on the job ticket request; and issuing the job ticket to the client device, according to a result of the judgment, wherein the job ticket includes the account ID;

receiving the account ID included in the job ticket of a job to be generated by attaching the job ticket issued to a job data indicating a processing subject and processing contents of the job and a charge count for the job to be processed by the peripheral device from the peripheral device; and performing charge process in accordance with the received account ID and the received charge count for the job processing.

9. A medium according to claim 8, further comprising the step of storing a limit value of charge account each account ID, wherein the step of issuing issues the job ticket in accordance with the limit value of charge account in corresponding to the account ID included in the job ticket request.

10. A server device connected to a peripheral device and a client device via a network, comprising:

means for receiving a job ticket request including a client user ID and an account ID from the client device;

means for judging whether or not a job ticket is issued based on the job ticket request;

means for issuing the job ticket to the client device, according to a result of the judgment, wherein the job ticket includes the account ID;

means for receiving the account ID included in the job ticket issued to a job data indicating a processing subject and processing contents of the job and a charge count for the job to be processed by the peripheral device from the peripheral device; and performing charge process in accordance with the received account ID and the received charge count for the job processing.

11. A device according to claim 10, further comprising means for storing a limit value of charge account each account ID, wherein the means for issuing issues the job ticket in accordance with the limit value of charge account in corresponding to the account ID included in the job ticket request.

* * * * *